United States Patent
Shore et al.

(10) Patent No.: US 6,319,484 B1
(45) Date of Patent: Nov. 20, 2001

(54) COMPOSITIONS FOR ABATEMENT OF VOLATILE ORGANIC COMPOUNDS AND APPARATUS AND METHODS USING THE SAME

(75) Inventors: Lawrence Shore, Edison; Robert J. Farrauto, Princeton; Michel Deeba, East Brunswick; Jordan K. Lampert, Metuchen; Ronald M. Heck, Frenchtown, all of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/460,924

(22) Filed: Dec. 14, 1999

(51) Int. Cl.$^7$ .................. B01J 8/02; C07C 7/12
(52) U.S. Cl. .............. 423/245.1; 422/173; 422/177; 423/213.7; 423/247; 502/71; 502/74; 502/77; 502/78; 502/79; 502/407; 502/414
(58) Field of Search .................. 502/71, 74, 77, 502/78, 79, 407, 414, 415; 423/213.7, 245.1, 246, 247; 422/173, 177

(56) References Cited

U.S. PATENT DOCUMENTS

| | | | |
|---|---|---|---|
| 3,476,508 | 11/1969 | Kearby et al. | 23/2 |
| 3,738,088 | 6/1973 | Colosimo | 55/104 |
| 5,147,429 | 9/1992 | Bartholomew et al. | 55/356 |
| 5,382,416 | 1/1995 | Nakano et al. | 423/213.2 |
| 5,538,697 * | 7/1996 | Abe et al. | 422/171 |
| 5,807,528 | 9/1998 | Nakano et al. | 423/213.2 |
| 5,871,347 | 2/1999 | Chen et al. | 432/72 |

FOREIGN PATENT DOCUMENTS

| | | | |
|---|---|---|---|
| 43 18 738 C1 | 7/1994 | (DE) | B01D/53/36 |
| 196 52 403 | 6/1998 | (DE) | B01D/53/86 |
| 0 508 513 A1 | 10/1992 | (EP) | B01D/53/36 |
| 0 600 483 A1 | 6/1994 | (EP) | B01D/53/36 |
| 0 491 359 B1 | 11/1994 | (EP) | B01D/53/36 |
| 0 491 360 B1 | 11/1994 | (EP) | B01D/53/36 |
| 0 630 680 B1 | 12/1996 | (EP) | B01D/53/56 |

(List continued on next page.)

OTHER PUBLICATIONS

Patent Abstracts of Japan, vol. 1, 1995, No. 09, Oct 31, 1995, JP 07155613.
Database WPI Section Ch, Week 199615, Derwent Publications, XP002163304, RU 2040313.

Primary Examiner—Steven P. Griffin
Assistant Examiner—Maribel Medina
(74) Attorney, Agent, or Firm—Richard A. Negin

(57) ABSTRACT

A composition for abatement of airborne pollution by volatile organic compounds ("VOCs") has an upstream composition which contains a protective adsorbent, e.g., Y zeolite, which is effective for adsorbing large VOC molecules, e.g., toluene, and a protective oxidation catalyst intimately intermingled therewith. The downstream composition contains a second adsorbent, e.g., a silver-containing ZSM-5, which is effective for adsorbing relatively smaller VOC molecules, e.g., propylene, and a second oxidation catalyst intimately intermingled therewith. Oxidation of VOCs while they are still retained on the adsorbents is promoted at temperatures lower than would be required if the VOCs were desorbed into the gaseous phase. Apparatus is provided including a first contact member (24) coated with the upstream composition and positioned upstream of a second contact member (32) coated with the downstream composition. A heat exchanger (22) equipped with a temperature control device (40) is positioned upstream of both contact members to vary the treatment temperature between an adsorption temperature range and a higher, oxidation temperature range, both lying within an operating temperature range of from about 20 to 500° C.

52 Claims, 3 Drawing Sheets

FOREIGN PATENT DOCUMENTS

| | | | | |
|---|---|---|---|---|
| 0 467 363 B1 | 4/1998 | (EP) | ............................... | B01D/53/56 |
| 0 516 850 B1 | 9/1996 | (EP) | ............................... | B01D/53/70 |
| 0 491 358 B1 | 3/1996 | (EP) | ............................... | B01D/53/92 |
| 0 603 900 B1 | 7/1998 | (EP) | ............................... | B01D/53/94 |
| 0 947 236 | 6/1999 | (EP) | ............................... | B01D/53/94 |
| 0 888 815 A2 | 1/1999 | (EP) | ............................... | B01J/20/18 |
| 0 415 410 B1 | 11/1995 | (EP) | ............................... | B01J/29/064 |
| 0 499 280 B1 | 5/1995 | (EP) | ............................... | B23C/5/24 |
| 8-10566 | 1/1996 | (JP) | ............................... | B01D/53/62 |
| WO 98/50151 | 12/1998 | (WO) | ............................... | B01J/29/06 |

\* cited by examiner

COMPOSITIONS FOR ABATEMENT OF VOLATILE ORGANIC COMPOUNDS AND APPARATUS AND METHODS USING THE SAME

BACKGROUND OF THE INVENTION

1. Field of the Invention

The present invention relates to a composition for abatement of pollution dispersed in the air and to an apparatus and a method using the composition. More specifically, the abatement composition of the invention comprises an intimate combination of first and second zeolites and an oxidation catalytic component. The abatement composition adsorbs and oxidizes volatile organic compounds, such as hydrocarbons, aldehydes, ketones, etc., in alternating adsorption and oxidation temperature ranges which lie within a low to moderate operating temperature range.

2. Related Art

A great deal of effort and a resulting large body of patent and technical literature is directed toward pollution abatement at its source, for example, by treating the exhaust of combustion devices such as internal combustion engine exhaust, plant stack gases, etc. Rather less effort has been devoted towards taking steps to clean the atmosphere, i.e., to treat ambient air to abate pollutants already contained therein. Illustrative of this latter approach is U.S. Pat. No. 3,738,088, "Mobile Air Cleaning Apparatus for Pollution Removal", issued on Jun. 12, 1973 to L. E. Colosimo. This patent discloses an air filtering assembly for abating ambient air pollution by providing duct work on a vehicle to direct an air stream of controlled velocity to various filter means to filter particulate pollutants from the air. Post-filter catalysts are also disclosed for catalytic abatement of ambient carbon monoxide, unburned hydrocarbons, nitrous oxide, sulfur oxides and the like. German Patent DE 43 18 738 C1, for "Verfahren zur physikalischen und chemischen Reinigung der Aussenluft" ("Method for the Physical and Chemical Cleaning of Atmospheric Air"), published on Jul. 14, 1994, similarly discloses a process for the physical and chemical cleaning of air utilizing a motor vehicle whose travel flows the air through the treatment devices.

U.S. Pat. No. 5,147,429, "Mobile Airborne Air Cleaning Station", issued on Sep. 15, 1992 to J. Bartholomew et al, discloses a dirigible carrying a plurality of different air-cleaning devices, including wet scrubbers, filtration machines and cyclonic spray scrubbers, to treat air which is flowed through the devices by movement of the dirigible through the air.

The use of a combination of adsorbents for hydrocarbons and a catalytic composition to promote the oxidation of the hydrocarbons is known in the art. For example, Japanese patent publication (Kokai) 8-10566 was published on Jan. 16, 1996 based on Japanese patent application of NGK Insulators, filed on Jul. 5, 1994 and entitled "A Catalyst Adsorbent For Purification of Exhaust Gases and An Exhaust Gas Purification Method." This document discloses the use of a silver-containing ZSM-5 zeolite and a platinum oxidation catalytic component for the treatment of the exhaust of internal combustion engines. At low exhaust temperature, such as that encountered upon initial startup of the engine, the silver-containing ZSM-5 zeolite adsorbs hydrocarbons in the exhaust and retains them until the temperature increases sufficiently to reach the light-off temperature of the platinum catalytic component, i.e., the temperature at which the catalytic component becomes effective for promoting oxidation of the hydrocarbons. Conventionally, the light-off temperature is considered to be that temperature at which the catalytic component is able to promote the oxidation of at least fifty percent of the hydrocarbons contacting the catalytic component. The objective of such compositions is to retain the hydrocarbons adsorbed in the adsorbent, typically zeolite, until a temperature of at least 250° C. has been attained, so that upon desorption of the hydrocarbon at the elevated temperature, the catalytic component is effective for promoting oxidation of the hydrocarbon.

SUMMARY OF THE INVENTION

Generally, the present invention provides a composition for abatement of gas-borne pollution, e.g., atmospheric pollution, caused by volatile organic compounds, and an apparatus and method using the same. The composition comprises a protective adsorbent zeolite and a second adsorbent zeolite and protective and second oxidation catalysts associated respectively therewith, with the second oxidation catalyst essentially being intimately intermingled with the second adsorbent and the protective oxidation catalyst preferably being intimately intermingled with the protective adsorbent. The protective adsorbent adsorbs, and thereby protects the second adsorbent from, certain relatively large molecule volatile organic compounds which, if they were to be adsorbed by the second adsorbent, would not readily, if at all, desorb from the second adsorbent or migrate to catalytic sites thereon for oxidation thereof. Although it is preferable that the protective oxidation catalyst be intimately intermingled with the protective adsorbent, it may alternatively be separate therefrom and interposed between the protective adsorbent and the second adsorbent in the flow path of the gas (e.g., air) stream being treated. In either case, the protective oxidation catalyst serves to promote oxidation of the relatively large molecule volatile organic compounds before they can contact the second adsorbent and be adsorbed thereon. The second adsorbent adsorbs relatively small volatile organic compounds which pass through the protective adsorbent. The second oxidation catalyst, which is always intimately contacted with, e.g., intimately intermingled with, the second adsorbent in the practices of the present invention, promotes the oxidation of the adsorbed small molecule volatile organic compounds while they are retained on the second adsorbent. The first and second oxidation catalysts may be identical to, or different from, each other and may be present in the same or different concentrations relative to their respective adsorbents.

Without wishing to be bound thereby, it is believed that volatile organic compounds adsorbed on an adsorbent zeolite which has a catalytic component intimately intermingled therewith, will migrate within or on the adsorbent from adsorption sites to catalytic sites thereof, a phenomenon sometimes herein referred to as "spillover". At the catalytic sites oxidation of the volatile organic compounds is promoted, even at temperatures well below those normally required to promote heterogeneous phase oxidation of hydrocarbons desorbed from the adsorbent. The spillover effect occurs with both the protective adsorbent and the second adsorbent, and so it is advantageous to intimately intermingle the protective oxidation catalyst with the protective adsorbent just as the second oxidation catalyst is intermingled with the second adsorbent. In this way the advantage of the spillover effect is gained for the protective adsorbent as well as for the second adsorbent. As noted above, the protective oxidation catalyst may, however, be interposed between the protective adsorbent and the second adsorbent, e.g., in a separate catalyst bed, to promote the oxidation of large molecule volatile organic compounds desorbed from the protective adsorbent before they contact the second adsorbent.

Unlike the prior art concerning the use of catalyzed zeolite adsorbents to oxidize, for example, hydrocarbons contained in the exhaust of internal combustion engines, the abatement compositions of the present invention do not require the attainment of temperatures sufficient to desorb the adsorbed volatile organic compounds from the zeolite adsorbents and into a gas stream to release them for catalyzed oxidation in the gas phase at the catalytic sites. Rather, the present invention is predicated on the finding that the compositions of the present invention will retain the adsorbed volatile organic compounds on their respective zeolite adsorbents, but permit the adsorbed compounds to migrate on the compositions, in the above-noted "spillover" effect, from the zeolitic adsorbent sites to catalytic sites on the adsorbent, wherein oxidation of the retained compounds is catalytically promote in reactions which take place at the catalytic sites. It has surprisingly been found that such catalyzed reaction of the volatile organic compounds (below referred to as "VOCs") while they are still retained on the abatement composition will take place at significantly lower temperatures than it would if the VOCs had been desorbed from the zeolites and entered the gas phase prior to being catalytically oxidized. Desorption of the VOCs from the zeolites into a gas (air) phase is a rate-limiting factor in the known hydrocarbon adsorption/desorption techniques. Such desorption is not only not necessary, but is not desirable in the practices of the present invention, in which desorption is believed not to take place to a significant degree (except with respect to the protective adsorbent and then only if the oxidation catalytic component is not dispersed therein).

Two different types of zeolite adsorbents are employed in the practices of the present invention: a protective adsorbent to adsorb large-molecule VOCs such as toluene, benzene or larger molecules, and a second adsorbent to adsorb relatively small-molecule VOCs such as propylene or smaller molecules. The oxidation catalytic components intimately intermingled with the zeolite adsorbents provide the catalytic sites to which the volatile organic compounds migrate from the zeolitic adsorption sites in the spillover effect.

Specifically, there is provided in accordance with the present invention a composition for abatement of VOCs. The composition comprises the following components. (a) One component is a protective adsorbent selected from the group consisting of zeolites having a minimum pore aperture of at least about 6.5 Ånstroms, e.g., from about 6.5 to 13 Ångstroms, and which are effective, within an adsorption temperature range, (i) to adsorb first VOCs and (ii) to pass therethrough second VOCs of smaller molecular dimensions than the first VOCs. (b) Another component is a second adsorbent selected from the group consisting of one or more of silver-containing zeolites and copper-containing Y and effective, within the adsorption temperature range, to adsorb second VOCs passed through the protective adsorbent. (c) A third component is a catalytically effective amount of a protective oxidation catalyst disposed relative to the protective and second adsorbents so as to contact and, under oxidation conditions defined below, promote the oxidation of first VOCs prior to any contact of the first VOCs with the second adsorbent. (d) A fourth component is a second oxidation catalyst (which may be the same as or different from the protective oxidation catalyst) which is intimately intermingled with the second adsorbent, and present in an amount effective to promote, under the oxidation conditions, oxidation of second VOCs retained on the second adsorbent.

The oxidation conditions comprise an oxidation temperature range which is hotter than the adsorption temperature range. Both the adsorption and oxidation temperature ranges lie in an operating temperature range of between about 20 to 500° C., for example, from about 20 to 250° C.

One aspect of the present invention provides for the protective adsorbent to be one or more of Beta, Y and Mordenite zeolites, and for the second adsorbent to be one or more of silver-containing ZSM-5, silver-containing Y, silver-containing Beta and copper-containing Y zeolites. For example, the protective adsorbent may be Y zeolite and the second adsorbent may be silver-containing ZSM-5 zeolite. (The zeolites are below and in the claims referred to simply as "Beta", "Y" or "Y zeolite", "Mordenite" and "ZSM-5".)

In one aspect of the present invention the protective adsorbent comprises a cation-containing zeolite, the cation being selected from the group consisting of one or more of proton, alkali metal, alkaline earth metal and rare earth metal cations.

In another aspect of the present invention, the silver-containing zeolites contain sufficient silver to occupy from about 10 to about 100 percent of the alumina sites of the silver-containing zeolites and the copper-containing Y contains sufficient copper to occupy from about 10 to about 100 percent of the alumina sites of the copper-containing Y.

Another aspect of the invention provides that the protective oxidation catalyst is dispersed directly onto one or both of (i) the protective adsorbent, and (ii) a particulate refractory metal oxide support which is intimately intermingled with the protective adsorbent. Similarly, another aspect of the invention provides that the second oxidation catalyst is dispersed directly onto one or both of (i) the second adsorbent itself and (ii) a particulate refractory metal oxide support which is intimately intermingled with the second adsorbent.

Certain aspects of the invention provide that the first and second oxidation catalysts may be one or more of platinum group metal catalytic components and transition metal catalytic components. For example, the first and second oxidation catalysts may comprise platinum catalytic components and, in a particular aspect, the composition may contain from about 0.1 to about 5 percent by weight platinum, as Pt.

One aspect of the present invention provides that the proportion by weight of the protective adsorbent to the second adsorbent is from about 1:9 to about 9:1, based on the weights of the respective protective and second adsorbents, including their cations.

An apparatus aspect of the present invention provides an apparatus for abatement of volatile organic compound pollution in an air stream, which apparatus defines an air flow path therethrough and comprises the following components: (a) an abatement composition for abatement of volatile organic compounds ("VOCs") as described above; (b) a treatment zone within which the abatement composition is disposed; (c) a heat exchanger disposed in heat exchange relationship with one or both of (i) such air stream at or upstream of the treatment zone and (ii) the abatement composition; and (d) a temperature control device operatively associated with the heat exchanger to periodically vary, between the adsorption temperature range and the oxidation temperature range, the temperature of one or both of (i) the air stream in the treatment zone and (ii) the abatement composition. The oxidation conditions comprise an oxidation temperature range which is hotter than the adsorption temperature range, both the adsorption and oxidation temperature ranges lying in an operating temperature range of between about 20 to 500° C.

A method aspect of the present invention provides a method for abatement of volatile organic compound pollution comprising treating an air stream containing VOCs by contacting the air stream with the above-described composition for abatement of volatile organic compounds. The method is carried out by the following steps: (a) flowing the air stream in series to first contact it with the protective adsorbent and then to contact it with the second adsorbent; and (b) periodically varying between the adsorption temperature range and the oxidation temperature range the temperature at which the air stream contacts the protective and second adsorbents, whereby, during the oxidation conditions, oxidation of desorbed first VOCs is promoted by the first catalytic composition and second VOCs migrate from adsorption sites on the second adsorbent to catalytic sites on the second adsorbent, at which catalytic sites oxidation of the second VOCs is promoted. Other aspects of the present invention are set forth in the following detailed description and in the appended drawings.

DETAILED DESCRIPTION OF THE INVENTION AND PREFERRED EMBODIMENTS THEREOF

Figure 1:
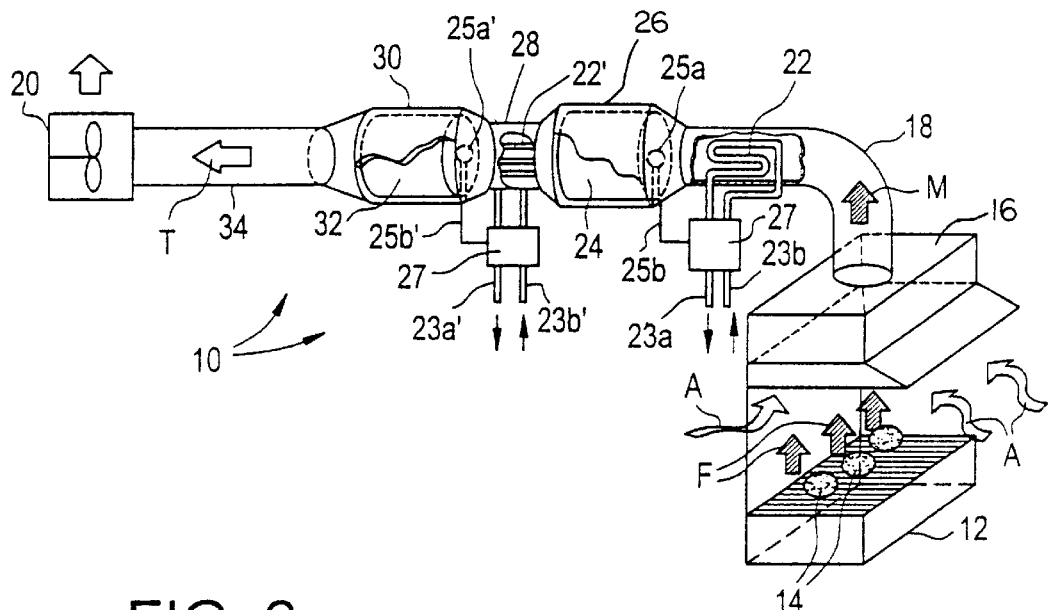
FIG. 1 is a perspective schematic illustration of an apparatus for abatement of volatile organic compound pollution in accordance with one embodiment of the present invention, associated with a cooking grill.

Referring now to FIG. 1, there is generally indicated at 10 an apparatus for abatement of volatile organic compounds engendered, in the illustrated embodiment, by fumes, schematically illustrated by the cross-hatched arrows F in FIG. 1, generated by the cooking on a grill 12 of food items 14, such as meat, poultry, fish, etc. The fumes thus generated contain numerous volatile organic compounds (which sometimes below and in the claims are abbreviated "VOCs") produced both by combustion of a fuel such as natural gas to heat the grill and by the cooking and charring of food items 14. The latter include combustion products from the burning of animal fat or other edible oils and greases which run off the food items 14 and into the flame or electrically heated coils of grill 12. A conventional flame hood 16 gathers the cooking fumes, entrained with ambient air as indicated by the arrows A, and directs them into conduit 18. The air stream with its included fumes is drawn into and through conduit 18, as shown by cross-hatched arrow M, by an exhaust fan 20.

Upstream contact member 24 is housed in the known manner within a first canister 26 which is connected in air flow communication by a transition conduit 28 with a second canister 30 within which is contained a downstream contact member 32. A heat exchanger 22 is positioned within conduit 18 and may be connected to a source of heat exchange liquid, such as conduits 23a, 23b. Alternatively, heat exchanger 22 may comprise an electric heater or the like. A temperature sensor 25a is connected by a signal line 25b to a temperature control device 27 which regulates heat exchanger 22 to control the temperature of the air stream being fed first to upstream contact member 24 and then to downstream contact member 32 for treatment. A second heat exchanger 22' may be positioned within transition conduit 28 between upstream contact member 24 and downstream contact member 32 to adjust the temperature of the air stream being fed to downstream contact member 32. Heat exchanger 22', like heat exchanger 22, is connected to a source of heat-exchanged liquid provided by conduits 23a', 23b'. A temperature sensor 25a' is positioned just ahead of downstream contact member 32 and is connected by a signal line 25b' to a temperature control device 27'. The latter regulates heat exchanger 22' to control the temperature of the air stream being fed to downstream contact member 32. For example, heat exchanger 22 may be used to cool the air stream to a desired temperature within an adsorption temperature range, e.g., about 20 to 100° C., or about 25 to 80° C., and heat exchanger 22' may be used to heat the air stream to a desired temperature within an oxidation temperature range, e.g., about 70 to 500° C., or about 100 to 500° C., or about 100 to 300° C., or about 100 to 250° C., or about 100 to 200° C. The treated air stream discharged from downstream contact member 32 flows through conduit 34, as indicated by arrow T, from whence it is expelled to the atmosphere by means of exhaust fan 20.

The upstream contact member 24 may comprise a honeycomb-type ceramic flow-through support member having a plurality of fine, parallel gas flow passages extending therethrough, and through which the air stream to be treated flows. Upstream contact member 24 may have, for example, from about 9 to 900 air flow passages ("cells") per square inch (equivalent to about 1.4 to 140 cells per square centimeter). The walls of the fine gas flow passages of upstream contact member 24 are coated with a first (upstream) abatement composition for abatement of volatile organic compounds in accordance with the present invention. For example, the first abatement composition may comprise one or more protective zeolites having a minimum pore aperture of from about 6.5 to 13 Ångstroms intimately combined with a suitable oxidation catalytic component, for example, platinum dispersed on fine particles of activated alumina. The oxidation catalytic component associated with the protective adsorbent (to provide the first abatement composition) is sometimes below and in the claims referred to as "the protective oxidation catalyst."

Downstream contact member 32 may be similar to upstream contact member 24, i.e., it may comprise another honeycomb-type refractory substrate member which is similar or identical to the substrate of upstream contact member 24. Thus, the substrate of downstream contact member 32 has a plurality of fine, gas-flow passages, the walls of which are coated with a second (downstream) abatement composition for abatement of volatile organic compounds in accordance with the present invention. The second abatement composition comprises a second zeolite such as one or more of silver-containing ZSM-5, silver-containing Y and copper-containing Y. The silver- or copper-containing zeolites comprising the second adsorbent are preferably loaded with sufficient silver or copper to occupy from about 10 to 100 percent of the alumina sites of the zeolites onto which they are loaded. The silver and copper metal ions are preferably ion-exchanged with their associated zeolite in order to provide a controlled siting of the metal ion in the zeolitic structure. It is within the purview of the present invention, however, to simply impregnate the zeolite with a solution of a soluble salt of the silver and/or copper metal ion. As is the case with the first abatement composition, a suitable oxidation catalytic component is intimately intermingled with the second zeolite and may comprise an oxidation catalytic component which is the same as or different from the protective oxidation catalyst. The oxidation catalytic component intimately intermingled with the second adsorbent (to provide the second abatement composition) is sometimes below and in the claims referred to as the "second oxidation catalyst."

Generally, the oxidation catalytic component may be one or more platinum group metals, preferably one of more of platinum, palladium and rhodium, and/or one or more transition metal oxides such as oxides of copper, cobalt, iron, manganese, nickel and vanadium. The oxidation catalytic component may be dispersed upon finely divided particles of a suitable refractory metal oxide support, such as activated alumina, and the supported catalytic component intimately intermingled with the zeolite in finely divided particulate form. Alternatively, in either or both the first (upstream) abatement composition and the second (downstream) abatement composition, the catalytic oxidation component may, in whole or in part, be dispersed directly upon, respectively, the protective and second adsorbent zeolites, and the utilization of a particulate refractory metal oxide support may be omitted. In another alternative, in either or both of the first and second abatement compositions, some of the catalytic oxidation component associated therewith may be directly dispersed on the protective and the second adsorbent zeolites and the balance of the oxidation catalytic components may be dispersed on the particulate refractory metal oxide support.

In use, the air stream containing the entrained VOCs passes through heat exchanger 22, which may be used to periodically either cool or heat the air stream, as required, so that the air stream will contact the upstream and downstream contact members 24, 32 in periodically alternating adsorption temperature ranges and oxidation temperature ranges.

During an adsorption period of operation, while the air stream entering the upstream contact member 24 is within the adsorption temperature range, e.g., about 20 to 100° C., or about 25 to 80° C., large-molecule VOCs such as toluene, xylene, stearic acid and decanol are efficiently adsorbed on the protective adsorbent, whose minimum pore aperture size of about 6.5 Ångstroms suits it to adsorb and retain such large size molecules. A preferred pore aperture size range is from about 6.5 to 13 Ångstroms. However, smaller VOCs, such as ethylene, propylene, ethanol and acetone, will largely escape adsorption on the protective adsorbent on upstream contact member 24, but will be adsorbed and retained by the second zeolite on downstream contact member 32, which is characterized by the ability to adsorb and retain such smaller sized molecules. After a pre-selected adsorption period, for example, about 16 minutes, temperature control device 27 will regulate the operation of heat exchanger 22 to provide the air stream entering upstream contact member 24 at a higher temperature, within the oxidation temperature range, e.g., from about 70 to 500° C., or about 100 to 500° C., or about 100 to 300° C. With the air stream contained within the oxidation temperature range, adsorption of some of the larger molecular weight VOCs on, respectively, the first and second zeolites will continue, but the adsorbed hydrocarbons will also migrate from their adsorption sites on both the first and second zeolites to catalytic sites occupied by, respectively, the first and second oxidation catalysts, e.g., platinum, respectively dispersed on, i.e., intimately intermingled with, the protective and adsorbent zeolites themselves. Alternatively, one or both of the first and second oxidation catalysts may be dispersed on fine, refractory metal oxide particles, such as activated alumina particles, which are intimately admixed with the protective and second adsorbents. As noted elsewhere herein, although the protective oxidation catalyst is preferably intimately intermingled with the protective adsorbent, it may optionally be interposed between the protective and second adsorbents, for example, by being coated in a washcoat of fine refractory metal oxide (e.g., gamma or "activated" alumina) particles onto a support member interposed between the first abatement composition containing the protective adsorbent and the second abatement composition. It is preferred, however, to intimately intermingle the protective oxidation catalyst with the protective adsorbent in order to obtain for the first abatement composition the benefit of the lower oxidation temperatures attainable by the spillover effect mentioned above. The following description will therefore deal primarily with the embodiments where the protective oxidation catalyst is intimately intermingled with the protective adsorbent.

Without wishing to be bound thereby, it is believed that the migration of VOCs giving rise to the spillover effect occurs on the second (downstream) abatement composition and, under certain circumstances, may occur on the first (upstream) abatement composition as well. (The first abatement composition is that containing the protective adsorbent and the second abatement composition is that containing the second adsorbent. In all cases herein and in the claims, the terms "upstream" and "downstream" are used relative to the direction of gas, e.g., the air stream being treated, flow over or through the abatement compositions and through the apparatus. Thus, the first abatement composition is positioned upstream of the second abatement composition.) The circumstances under which the spillover effect takes place on the first abatement composition are that the temperature at which significant oxidation of the VOCs occurs ("the light-off temperature") is significantly lower than the temperature at which the VOCs desorb.

It is not necessary nor even desirable that the adsorbed VOCs should undergo the rate-limiting step of desorption from the respective protective and second adsorbents to enter the air stream for heterogeneous phase catalytic oxidation of the desorbed VOCs by contact with the solid catalytic oxidation sites. Instead, the spillover, i.e., the migration of the VOCs from the adsorption sites to the catalytic sites while being retained on the abatement composition, provides effective catalytic oxidation of the VOCs which is not limited by the rate of desorption of the VOCs or the rate of mass transfer of desorbed VOCs from the gaseous to the solid phase.

In an alternate embodiment, only a single contact member may be provided in lieu of the upstream and downstream contact members 24, 32 illustrated in FIG. 1. In such case, the upstream portion of a single monolith may be coated with the upstream abatement composition and the downstream portion coated with the downstream abatement composition. In another embodiment, separate upstream and downstream contact members 24, 32 may be contained within the same canister. In yet another embodiment, the upstream abatement composition may be coated on the walls of the gas flow passages in a separate discrete layer overlying a layer of the downstream abatement composition also coated on the walls of the gas flow passages of the contact member. With this overlying layered arrangement, the air flow is constrained to pass through the overlying layer of upstream abatement composition before contacting the underlying layer of downstream abatement composition.

The reason for placing a composition containing the protective adsorbent upstream of a composition containing the second adsorbent is to accommodate situations wherein the VOCs comprise molecules whose dimensions are such that they would be adsorbed by the second adsorbent and so firmly retained thereon even at the oxidation temperature range contemplated herein (e.g., a range of 70° C. to 500° C., preferably, 100° C. to 300° C.) they would saturate and effectively "poison" the second adsorbent. This class of molecules essentially comprises the lower end of the size range of VOCs whose molecules are adsorbed on the protective adsorbent at the adsorption temperature range contemplated herein (e.g., 20 to 150° C., preferably 20° C. to 100° C.). Consequently, in treating an air stream which contains such VOCs, placement of the second adsorbent upstream of the protective adsorbent, or elimination of the protective adsorbent, will cause the second adsorbent, e.g., silver-containing Beta, silver- or copper-containing Y or silver-containing mordenite, to hold such VOCs so tightly that both their desorption and spillover migration from adsorption sites to catalytic sites will be severely hampered if not eliminated altogether, even at temperatures within the oxidation temperature range. The result would be a build-up of such VOCs in the mis-positioned second adsorbent. Such VOCs generally comprise the lower end of the size range of VOCs which are adsorbable on the protective adsorbent. For example, toluene is, at the adsorption temperature range contemplated herein, adsorbed by both the protective and second adsorbents. It is, however, much more firmly held by the second adsorbent than by the first adsorbent so that if toluene (or other VOCs of similar adsorption/desorption characteristics) were to be contacted with the second adsorbent in the practices of the present invention, the toluene would build up on the second adsorbent and saturate it, effectively "poisoning" it for the purposes herein contemplated. Therefore, when treating air streams containing both small- and large-molecule VOCs, the first abatement composition, defined as that containing the protective adsorbent, is placed upstream of the second abatement composition, defined as that containing the second adsorbent. This may be attained by a series arrangement of the first and second abatement compositions, or by coating the first abatement composition in a protective layer over the second abatement composition.

The abatement compositions of the present invention may be used in any application in which VOCs contained in air are to be abated. Thus, the present invention is applicable to abatement of VOC pollution in ambient air such as the air supplied to buildings or passenger cabins of aircraft, ships, vehicles and the like. The composition, apparatus and methods of the present invention are thus applicable to treating environmental air and may, for example, be integrated into or otherwise used in conjunction with conventional air conditioning and air heating systems.

Figure 2:
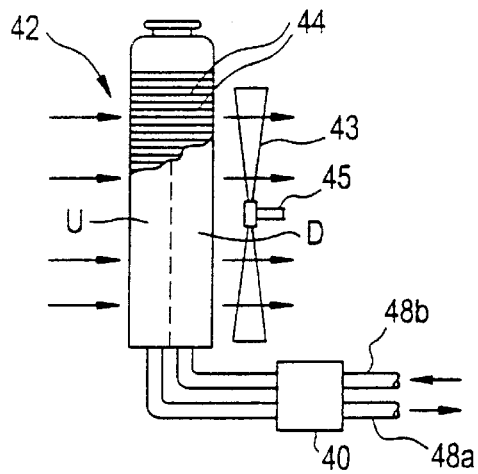
FIG. 2 is a schematic side elevation view of the radiator of an internal combustion engine modified in accordance with a second embodiment of the present invention.
Figure 2A:
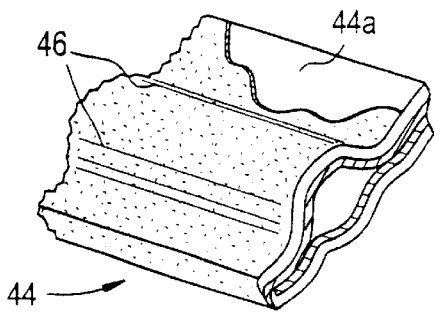
FIG. 2A is a perspective view, enlarged relative to FIG. 2, of a typical finned tube of the radiator of FIG. 2 showing thereon a coating of an abatement composition in accordance with an embodiment of the present invention.

The composition, apparatus and methods of the present invention also find utility in treating outdoor atmospheric air by being used in conjunction with vehicles, the movement of which will force atmospheric air through apparatus of the present invention carried on the vehicle. For example, in another embodiment of the invention, the hydrocarbon abatement composition may be coated onto the surface of the radiator of an internal combustion engine of a vehicle so that, as the vehicle travels, air forced through the radiator is contacted with the hydrocarbon abatement composition. Suitable coolant controls may be added to the vehicle to control the radiator temperature to provide alternating periods of adsorption and oxidation temperatures. An illustration of this type of arrangement is schematically illustrated in FIG. 2, wherein there is shown apparatus in accordance with another embodiment of the present invention which comprises a radiator 42 of a vehicle, such as the conventional radiator used to cool the engine of an automobile, truck or other such vehicle. A conventional radiator fan 43 mounted on fan shaft 45 draws air through radiator 42 in the usual manner, as indicated by the unnumbered arrows in FIG. 2. Radiator 42 has been modified, as shown in FIG. 2A, by having had coated on a substrate 44$a$, provided by the coolant tube fins 44, a coating 46 of the abatement composition of the present invention, to thereby provide the coated surface of coolant tube fins 44 as a treatment surface. Some of the fins 44 or portions thereof are coated with a first abatement composition comprising an intimate combination of the protective adsorbent and the protective oxidation catalyst, whereas other fins 44 or other portions thereof are coated with a second abatement composition comprising an intimate combination of the second zeolite and the second oxidation catalyst. Thus, fins 44 may be coated with, respectively, the first and second abatement compositions to provide an upstream treatment surface having a coating of the first abatement composition in the portion of radiator 42 designated by the letter U in FIG. 2, and a downstream treatment surface defined by a coating of the second abatement composition coated onto the radiator fins 44 in the portion of radiator 42 designated by the letter D in FIG. 2. The temperature of coolant, which is circulated in the conventional manner from the engine block (not shown) through radiator 42 via inlet tube 48$a$ and outlet tube 48$b$, may be controlled by a temperature control device 40 which functions in a manner analogous to temperature control device 27 of FIG. 1 to vary the temperature of the radiator fins between an adsorption temperature range and a hotter oxidation temperature range, e.g., as described above, both temperature ranges lying within an operating temperature range of about 20 to 500° C., e.g., about 20 to 250° C.

Figure 3A:
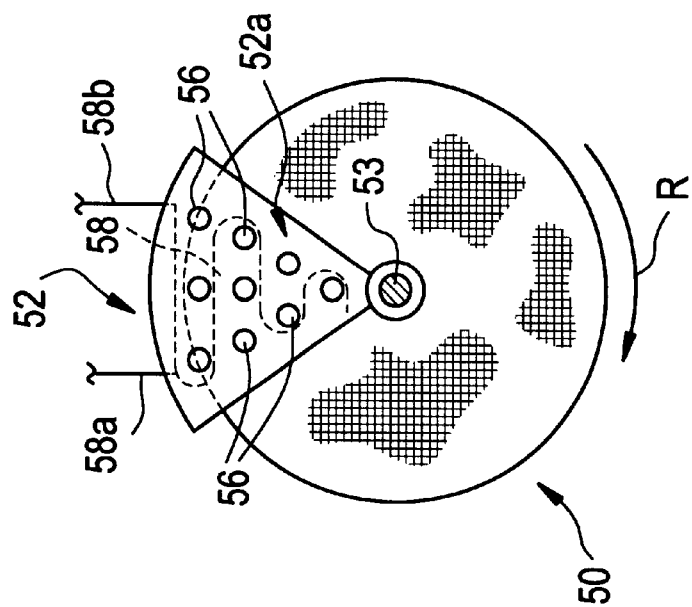
FIG. 3A is a view taken along line 3A—3A of FIG. 3.
Figure 3:
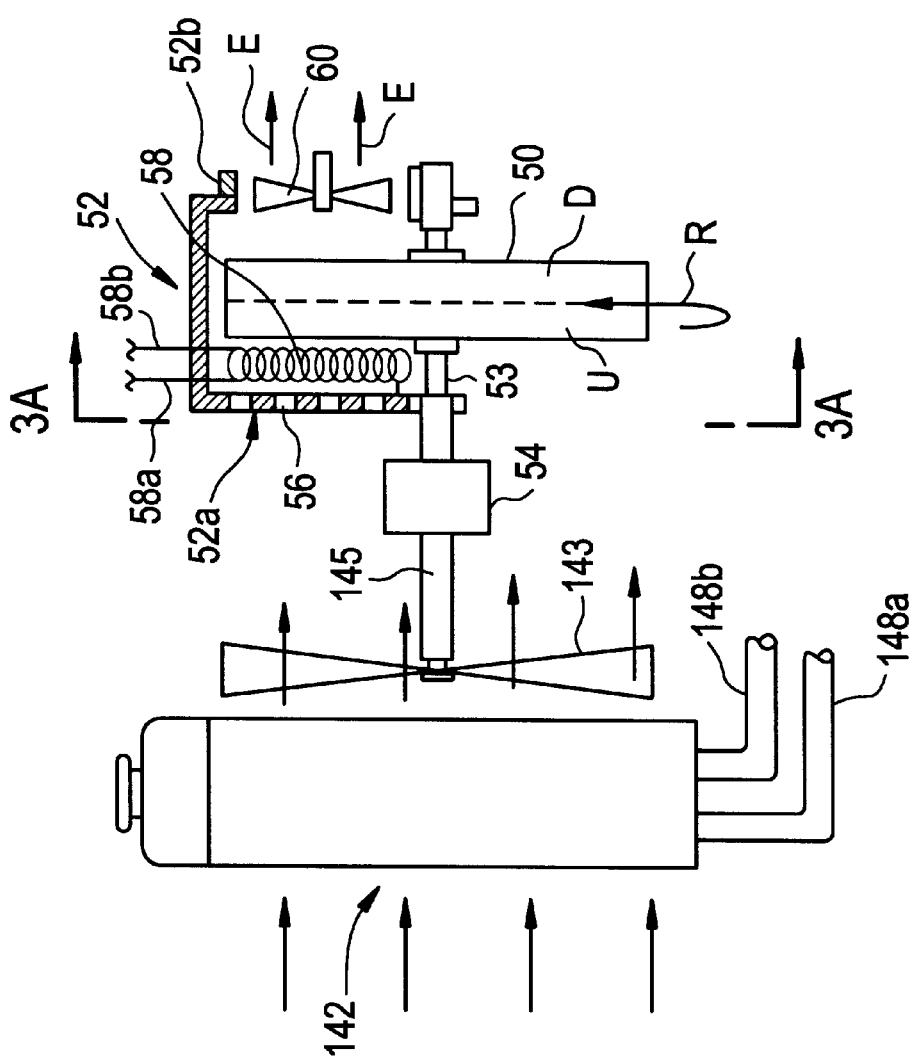
FIG. 3 is a schematic side elevation view, partly in cross section, of a conventional radiator of an internal combustion engine modified in accordance with a third embodiment of the present invention.

Referring now to FIG. 3, there is shown another embodiment of the apparatus of the present invention in which a conventional vehicle coolant radiator 142 is equipped with a radiator fan 143 and inlet and outlet tubes 148$a$, 148$b$ for transporting a liquid coolant through the interior of radiator 142. In this case, a wheel-like contact member 50 is mounted behind (downstream of) radiator 142 for rotation within a shroud 52 with the fine, gas flow passages of contact member 50 disposed parallel to the direction of airflow indicated by the unnumbered arrows in FIG. 3. Shroud 52 may cover any desired portion of the surface area of the face of contact member 50, e.g., from about 5 to 50 percent thereof, preferably from about 5 to 25 percent thereof. Contact member 50 rotates in the direction indicated by the arrow R in FIGS. 3 and 3A. A gear reduction box 54 connects fan shaft 145 to drive shaft 53. Shroud 52 is supported by support means (not shown) which retain it in a stationary position as contact member 50 rotates through it. Shroud 52 has a series of apertures 56 formed in the upstream face 52a thereof. A heating coil 58 is positioned within shroud 52 between upstream face 52a and contact member 50. Leads 58a, 58b connect heating coil 58 to a source of electrical power, such as the battery of an automotive vehicle, or a supplemental battery provided for heating purposes. Alternatively, coil 58 may be a heat exchange coil heated by a fluid, such as heated radiator coolant from radiator 142.

An exhaust fan 60 is mounted in the downstream face 52b of shroud 52 to draw air through apertures 56, thence through the portion of contact member 50 disposed within shroud 52 and then to discharge, as indicated by the arrows E in FIG. 3. Fan shaft 145 is driven in the conventional manner by a fan belt (not shown) and drive shaft 53 is geared down to rotate contact member 50 at a rate below that of fan 143. For example, the gear reduction may be designated to rotate drive shaft 53 and therefore contact member 50 at from about 2 to 10 revolutions per minute.

In operation, air drawn through radiator 142 flows through the passageways of contact member 50 which are coated with the first and second abatement compositions. An upstream segment U (FIG. 3) of contact member 50 may be coated with the first abatement composition and a downstream segment D may be coated with the second abatement composition in a manner analogous to that described above with respect to radiator 42 of FIG. 2. Alternatively, the second abatement composition may be coated as an underlayer on the gas flow passages of contact member 50 and the first abatement composition may be coated as an overlayer.

The constantly rotating wheel-like contact member 50 passes through a relatively cool adsorption zone outside shroud 52 wherein VOCs are adsorbed onto the first and second abatement compositions and then through a relatively hot oxidation zone within shroud 52 wherein oxidation of the adsorbed VOCs takes place, by the above-described spillover phenomenon. As the portion of contact member 50 within shroud 52 emerges therefrom, it is contacted with a relatively cool air stream and quickly cools from temperatures within the oxidation temperature range to temperatures within the adsorption temperature range.

In accordance with the teachings of the present invention, the protective adsorbent serves to protect the second adsorbent from VOCs which would be so firmly held by the second adsorbent that they would neither desorb nor migrate to catalytic oxidation sites in sufficient quantity to avoid "poisoning" the second adsorbent by saturating it with the too-firmly held VOCs. On the other hand, the second adsorbent must be able, at least in the adsorption temperature range, to adsorb and retain smaller VOCs sufficiently to adsorb them in the first place and, at the oxidation temperature range contemplated herein, retain them with sufficient strength to prevent or minimize desorption into the gas phase while permitting the VOCs to migrate to the catalytic sites intimately intermingled with the adsorption sites of the second zeolite.

The reason that, in accordance with the teachings of the present invention, the second zeolite is impregnated or ion-exchanged with silver or, in the case of Y, with silver or copper, is to enable the second zeolite to adsorb VOCs in the presence of moisture. Moisture is, of course, naturally present in air, and is inimical to the ability of zeolites such as ZSM-5, Y and Beta to adsorb and retain the smaller molecule VOCs such as propylene. It has been found, as noted above, that the addition of metals such as silver to ZSM-5, Y or Beta, or the addition of copper to Y, e.g., in amounts sufficient to occupy at least ten percent of the alumina sites of the zeolite, enables the zeolite to adsorb and retain hydrocarbons within the operating temperature range described herein, or at least within a significant portion of that range.

Examples 1 and 1A demonstrate the efficacy of the addition of silver to certain zeolites, e.g., ZSM-5, Y and Beta, and of the addition of copper to Y, in respect of enabling the zeolites to adsorb and retain a typical second VOC, in this case a light hydrocarbon (propylene), in the presence of moisture.

EXAMPLE 1

A. Sample Preparation

Some test samples were provided by coating a washcoat onto the walls of the gas flow passages of cordierite carriers measuring ¾ inch (equivalent to 1.9 centimeters, "cm") in diameter, ¾ inch (1.9 cm) in length, and having 400 gas flow passages per square inch of end face area, i.e., 400 cells per square inch ("cpsi"), equivalent to about 62 cells per square centimeter. The cordierite carriers were conventional so-called honeycomb carriers of generally cylindrical configuration and having a plurality of fine, parallel gas flow passages extending from and through the front to the rear faces thereof. Other test samples comprised particulate extrudates, as described below.

A comparative Sample C1 was prepared by coating respective cordierite carriers with a washcoat composition comprising fine particles of ZSM-5 zeolite and activated alumina, the latter having platinum dispersed thereon. At least 90% of the particles of zeolite and alumina had a diameter of 10 microns or less. The platinum on alumina was prepared in the conventional manner, by impregnating alumina particles with a solution of a soluble platinum salt or complex and fixing the platinum on the alumina with a 5% acetic acid solution, then drying and calcining the impregnated alumina in air. In the conventional manner, an aqueous slurry of the zeolite and platinum/alumina particles was prepared and applied to the walls of the flow passages of the carrier, which was thereafter dried in air at 120° C. and calcined at 550° C. in air. Comparative sample C1 contained 2 grams per cubic inch ("$g/in^3$") of the washcoat coating comprised of 1 $g/in^3$ of the ZSM-5 zeolite, and 1 $g/in^3$ of the platinum on alumina oxidation catalytic composition. Platinum was dispersed on the alumina only and was present in the amount of 35 grams per cubic foot ("$g/ft^3$"). As is conventional in the art, the weight per volume referred to above (and elsewhere herein) for the loading of the washcoat components on the sample is the weight of component per volume of the coated cordierite carrier, which includes the void spaces provided by the gas flow passages thereof.

Comparative sample C2 was prepared in a manner similar to that used for the preparation of Comparative Sample C1 except that the alumina support was omitted and the washcoat consisted of platinum dispersed directly on fine particles of ZSM-5. The washcoat loading for Sample C2 was 2 $g/in^3$ including 30 $g/ft^3$ platinum.

Comparative Sample C3 comprised a bed of extrudates obtained by extruding a wet mass of a 5:1 weight ratio of the hydrogen form of Y with bentonite clay. No catalytic metal and no ion-exchanged silver or copper was included. The extrudates were about ¹⁄₁₆ inch (equivalent to about 1.59 millimeters, "mm") in diameter and about ¼ inch (equivalent to about 6.35 mm) in length.

Sample A1 was a non-catalyzed component of an embodiment of the present invention, to be used in the practices of the present invention in combination with a suitable oxidation catalyst. Sample A1 contained 2 g/in³ of a washcoat consisting of mordenite ion-exchanged with silver to provide about 3% by weight silver, based on the dry (calcined) weight of silver-containing zeolite. No platinum or other catalytic metal was employed.

Samples A2 and A3 were extrudates prepared in a manner similar to that used for comparative Sample C3, except that in one case (Sample A2) Y zeolite was conventionally ion exchanged to provide a copper-exchanged Y having about 3% by weight copper, and in the other case (Sample A3) Y zeolite was conventionally ion-exchanged to provide a silver-containing Y having about 3% by weight silver.

B. Test Procedure

A test gas comprised of zero air (a "synthetic" dry air consisting of 79% by volume nitrogen and 21% by volume oxygen) to which propylene and water were added was flowed through the samples during the test procedure. The test gas was flowed through the carrier with and without water present in the test gas and the amount of desorption and adsorption of propylene was measured.

C. Test Results

Each of the samples was tested in a zero air test stream containing water and 6, 10 or 900 parts per million by volume propylene at the space velocity indicated in Table 1, which tabulates the results of these tests, each of which was carried out at a test gas inlet temperature to the sample of 80° C.

TABLE 1

| Sample | Space[1] Velocity | $C_1$ ppm | $H_2O$ %[2] | Zeolite | Metal[3] Cation | Adsorption of Propylene |
|---|---|---|---|---|---|---|
| C1 | 60,000 | 900 | 3.0 | ZSM-5 | None | No |
| C2 | 60,000 | 900 | 3.0 | ZSM-5 | None | No |
| C3 | 60,000 | 6 | 1.5 | Y | None | No |
| A1 | 60,000 | 900 | 0 | Mordenite | 3% Ag | Yes |
| A1 | 60,000 | 900 | 3.0 | Mordenite | 3% Ag | No |
| A2 | 120,000 | 6 | 1.5 | Y | 3% Cu | Yes |
| A3 | 120,000 | 10 | 1.5 | Y | 3% Ag | Yes |

[1]Vol. of test air stream at 25° C. and one atmosphere per volume of test sample, per hour.
[2]Percent by volume $H_2O$.
[3]Percent by weight of the elemental metal of the total weight of metal plus zeolite, calcined basis.

As indicated by Table 1, water present in the amount of three % by volume, substantially no propylene was adsorbed by the comparative Sample C1. The data of Table 1 also show that the presence of silver or copper in Y zeolite is necessary for the zeolite, whether or not the platinum oxidation catalytic component is present, to adsorb propylene from the air test stream in the presence of moisture. Neither silver-containing mordenite nor the hydrogen form of mordenite was able to adsorb propylene in the presence of moisture. Even though the comparative Samples C1 and C2, like Sample A1, were tested with high concentrations (900 ppm) of propylene, no propylene adsorption was noted for Samples C1 and C2, whereas at much lower propylene concentrations (6 and 10 ppm), propylene adsorption was attained by Samples A2 and A3 and, under dry conditions, by Sample A1. With moisture (3.0% by volume $H_2O$) present, Sample A1, a mordenite zeolite, was not able to adsorb propylene as it could under dry conditions. Samples A2 and A3, respectively, copper-containing Y and silver-containing Y, adsorbed propylene even with moisture present. These results show the capacity of the tested second adsorbents to adsorb relatively small molecule VOCs.

EXAMPLE 1A

A. Three samples were prepared by the following procedure. A slurry of silver ion-exchanged particles was prepared by dissolving silver nitrate in deionized water and adding the zeolite. An ammonium silicate solution was added as a binder to give a final $SiO_2$ concentration from the binder in the dehydrated slurry of 2% by weight of the weight of dehydrated solids. The slurry was ball milled to a particle size range in which 90% of the particles were less than 10 microns in diameter. The solids content of the slurry was adjusted with deionized water to a level suitable for coating onto a cordierite honeycomb core measuring ¾ inch (1.9 cm) in diameter by ¾ inch (1.9 cm) in length. The carrier was coated to provide a washcoat coating and then dried at 140° C. for 1 hour and calcined in air at 500° C. for 4 hours.

The three samples differed in these particulars: for Sample 1A-1 a 10% Ag on ZSM-5 slurry was equilibrated for up to 17 hours at 60° C. to ion-exchange silver ions onto the zeolite. The silver-containing zeolite particles were then dewatered through filter paper supported on a Buchner funnel, the resulting filter cake was washed with deionized water, and the material was dried and calcined as above. The ion exchange and calcining process was then repeated twice more. The resulting calcined Ag/ZSM-5 powder contained 3.9% Ag. (All references in this example to percentage of silver are on the basis of the weight of the Ag as a percentage of the total dry basis (calcined) weight of Ag and the zeolite.) A slurry was then prepared by combining 100 grams of deionized water and 100 grams of the calcined Ag/ZSM-5 powder, adding ammonium silicate binder and coating the carrier as in Example 1, except that the washcoat loading was at 2.75 g/in³.

Sample 1A-2 was prepared in the same manner as Sample 1A-1, except that Beta zeolite having a Si to Al atomic ratio of 13 was used instead of ZSM-5 and only the first ion exchange step was used. The resulting calcined Beta zeolite powder contained 3.3% Ag. This Ag/Beta material was then coated onto a cordierite monolith as in the preparation of Sample 1A-1, except at a washcoat loading of 2.7 g/in³.

Sample 1A-3 was prepared in the same manner as Sample 1A-2, except that Y zeolite (Si to Al atomic ratio of 20) was substituted for the Beta zeolite. The calcined powder used to prepare Sample 1A-3 was 2.0% Ag on Y zeolite, and was applied as a washcoat, as in the case of Sample 1A-1, except at a loading of 2.9 g/in³.

B. A laboratory reactor was supplied with an engine exhaust feed gas of a composition (calculated on a volume basis) of 570 ppm by volume propylene calculated as $C_1$ equivalent to 190 ppm as propylene, 0.57% carbon monoxide, 0.19% hydrogen, 13% water vapor, 15 ppm sulfur dioxide, the balance comprising nitrogen and oxygen in approximately a 4:1 volume ratio. An adsorption phase was carried out by flowing the hydrocarbon-containing feed gas through the traps for 1 minute and 45 seconds at 75° C. and a gas flow rate equivalent to 50,000/hr space velocity. The space velocity is the volume of gas, measured at 25° C. and one atmosphere pressure, flowed through the adsorbent bed per volume of the bed, per unit of time. The adsorption phase was terminated and the desorption phase was begun by shutting off the hydrocarbon flow and heating the test sample at a rate of 50° C. per minute to a temperature of 400° C. or 500° C., as indicated below. As used in this example, total propylene (or other hydrocarbon) exposure means the total amount of propylene (or other hydrocarbon) to which the trap was exposed during the adsorption phase. Reference to an "adsorption phase" and to a "desorption phase" means adsorption and desorption phases as described in this Part B.

C. The feed gas was flowed through each of the Samples 1A-1, 1A-2 and 1A-3 in the reactor first in an adsorption phase, and then in a desorption phase. The results are tabulated in Table 1A.

TABLE 1A

| Sample No./<br>Zeolite (% Ag) | Adsorption Phase<br>% Total HC<br>Adsorbed at<br>Indicated Temp[1] | Desorption Phase<br>Remaining % of Total HC<br>at Indicated Temperature[1] | | | |
|---|---|---|---|---|---|
| Temp ° C.→ | 75 | 100 | 200 | 300 | 400 |
| 1A-1. ZSM-5 (3.9) | 85 | 70 | 68 | 52 | 20 |
| 1A-2. Beta (3.3) | 45 | 15 | 10 | 5 | 0 |
| 1A-3. Y (2.0) | 30 | 10 | 5 | 0 | 0 |

[1]The percentage of the total amount of hydrocarbon to which the trap was exposed during the adsorption phase ("Total HC") which remains adsorbed in the trap at the end of the 75° C. adsorption phase.
[2]The percentage of Total HC that remains adsorbed in the trap when the indicated temperature of the desorption phase was attained.

The results of this example demonstrate that silver-exchanged ZSM-5 has the best ability to adsorb light olefins, i.e., those having relatively small molecules under the severe moisture conditions of 13% steam, and that silver-exchanged Beta and Y zeolites also have the ability to do so, but are markedly inferior to ZSM-5, at least under the severe moisture test conditions used.

The following Example 1B shows the relative adsorption capabilities of ZSM-5, Beta and Y zeolites for larger (xylene) molecules.

EXAMPLE 1B

The effect of zeolite aperture size on the adsorption of first VOC molecules is demonstrated in this example, which records tests which were conducted to evaluate hydrocarbon retention for the adsorption of a first VOC, xylene in this case, by a Ag/ZSM-5 sample. Adsorption phase testing and desorption phase testing as described in Example 1A were conducted, except that the test gas contained 550 ppm of mixed xylenes (as $C_1$) instead of the propylene. The xylene mixture was 40% para-xylene, 60% mixed ortho- and meta-xylene. It is known that para-xylene, having a linear configuration of the methyl groups on the benzene ring, has a dimensionally smaller aspect than either the ortho- or meta-xylene isomers. Four Ag/zeolites prepared as described in Example 1A were prepared as follows. Sample 1B-1 was a 5% Ag/ZSM-5; Sample 1B-2 was a 3.5% Ag/ZSM-5 (Si to Al atomic ratio of 65); Sample 1B-3 was a 3.3% Ag/Beta zeolite; and Sample 1B-4 was a 2% Ag/Y zeolite. The Ag/Beta zeolite and the Ag/Y zeolite, both having apertures wider than the widest aspect of the ortho and meta-xylene molecules, adsorbed nearly 100% of the xylene mixture to which they were exposed. Specifically, as summarized in Table 1B below, the Ag/Beta and the Ag Y zeolites adsorbed 99% and 97% of the xylenes at 75° C., and retained 98% and 92% at 300° C., 94% and 50% at 400° C., and 89% and 10% at 500° C. of total hydrocarbon exposure, respectively. The 5% Ag/ZSM-5 zeolite and the 3.5% Ag/ZSM-5 zeolite, both having smaller apertures than the Beta or Y zeolites, adsorbed largely only that 40% fraction of the xylene mixture comprised of the smaller-aspect para-xylene. Specifically, the 5% Ag/ZSM-5 zeolite and the 3.5% Ag/ZSM-5 zeolite adsorbed 52% and 50% of the xylenes at 75° C., and retained 50% and 45% at 300° C. and 42% and 10% at 500° C., of total xylene exposure, respectively.

TABLE 1B

| Sample No./<br>Zeolite (% Ag) | Adsorption Phase<br>% Total HC<br>Adsorbed at<br>Indicated Temp[1] | Desorption Phase<br>Remaining % of Total HC<br>at Indicated Temperature[2] | | |
|---|---|---|---|---|
| Temp ° C.→ | 75 | 300 | 400 | 500 |
| 1B-1. ZSM-5 (5.0) | 52 | 50 | — | 42 |
| 1B-2. ZSM-5 (3.5) | 50 | 45 | — | 10 |
| 1B-3. Beta (3.3) | 99 | 98 | 94 | 89 |
| 1B-4. Y (2.0) | 97 | 92 | 50 | 10 |

[1]The percentage of the total amount of hydrocarbon to which the trap was exposed during the adsorption phase ("Total HC") which remains adsorbed in the trap at the end of the 75° C. adsorption phase.
[2]The percentage of Total HC that remains adsorbed in the trap when the indicated temperature of the desorption phase was attained.

The results of this Example 1B demonstrate the capability of silver-exchanged Beta and Y zeolites to trap large π-bonded molecules, and the lesser ability of ZSM-5 zeolite to do the same. It is to be noted that the 5% silver-containing ZSM retained a very high proportion of the adsorbed hydrocarbons even at 500° C. and the 3.5% silver-containing ZSM-5 did so at 300° C.

EXAMPLE 2

A. Test samples comprising a washcoat comprised of ZSM-5 and platinum on alumina coated onto a cordierite honeycomb carrier were prepared generally in the manner described in Part A of Example 1, except that the ZSM-5 zeolite was impregnated with silver by a conventional ion exchange technique so that silver comprised about 4% by weight of the combined weight of silver plus zeolite on a calcined basis. The size of the zeolite particles and of the activated alumina particles on which the platinum was dispersed was that at least 90 percent of the particles had a diameter less than about 10 microns. The alumina particles were impregnated with platinum from a solution of a soluble platinum compound or complex. The impregnated alumina was dried in air at about 120° C. and then calcined in air for about 1 hour at 500° C. The calcined platinum/alumina particles contained 2 weight percent platinum, as a weight percent of the combined weight of platinum and alumina on a calcined basis. The combined zeolite and platinum/alumina material was deposited as a washcoat on cordierite sample cores to provide a loading of 2.15 g/in³ of silver-containing ZSM-5, 2.2 g/in³ of alumina, and 76 g/ft³ of platinum.

B. The samples were tested with two different test gases, one comprising nitrogen containing selected amounts of propylene, and the other comprising zero air containing selected amounts of propylene.

Figure 4:
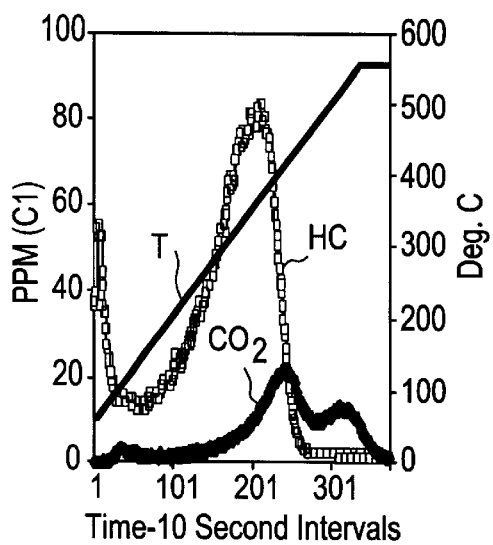
FIG. 4 is a graph showing the quantity of desorption of propylene and evolution of carbon dioxide attained in a nitrogen test gas at the indicated temperatures over the indicated time intervals.
Figure 5:
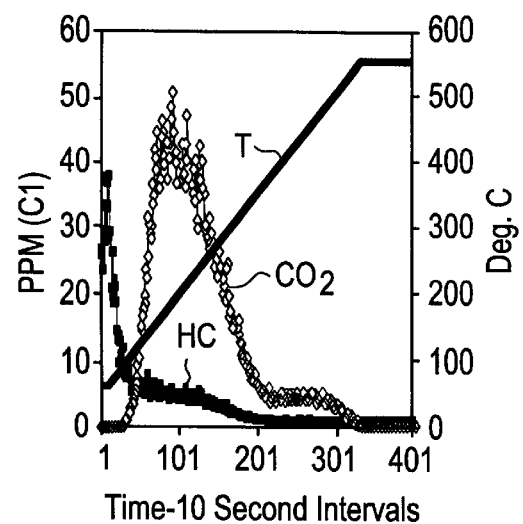
FIG. 5 is a graph similar to that of FIG. 4 but for an air test gas.
Figure 6:
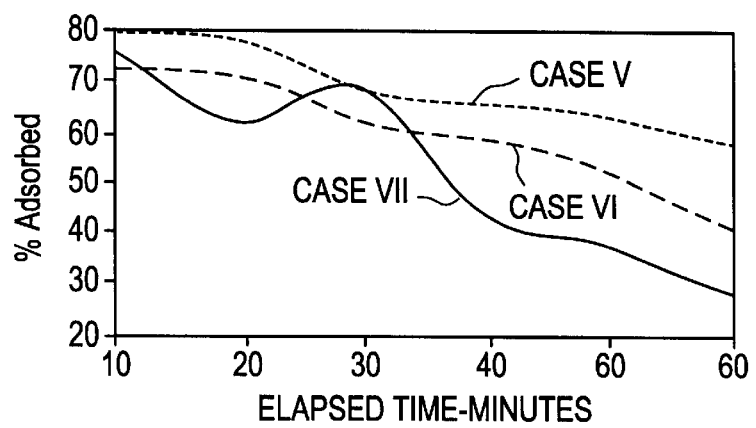
FIG. 6 is a graph showing the percentage of adsorption of hydrocarbons in an air test gas as a function of time for several test cases.

Typical results of these tests are shown in FIG. 4 for the nitrogen test gas, and in FIG. 5 for the air test gas. Both of FIGS. 4 and 5 indicate on the left vertical axis the parts per million (as $C_1$) of propylene and the parts per million carbon dioxide detected in the test stream discharged from the tested sample, versus the temperature (shown in ° C. on the right vertical axis) of the gas stream introduced to the test sample. The temperature is read by moving horizontally from any point on the line marked "T" to the right vertical axis. The horizontal axis in each of FIGS. 4, 5 and 6 represents time in units of ten-second intervals, the initial measurement being taken at ten seconds after introduction of the test gas, and the measurements continuing (FIG. 4) for 401 ten-second intervals or 4,010 seconds (66.8 minutes).

Referring now to FIG. 4, it is seen that in a nitrogen gas stream desorption of propylene from the abatement composition proceeds slowly, with an initial release of propylene becoming noticeable only at a temperature approaching 150° C. $CO_2$ is evolved, showing oxidation of the propylene by oxygen adsorbed in the porous washcoat of the test sample, with the generation of $CO_2$ peaking at slightly over 200 time units and then rapidly declining as the stored oxygen is used up. A similar pattern was shown by similar tests using, respectively, fifty ppm propylene and 90 ppm propylene, both measured as $C_1$. It will be noted that desorption of propylene began only at temperatures above about 150° C., showing the ability of the silver-containing ZSM-5 to adsorb and retain propylene at temperatures up to 150° C. or higher.

FIG. 5 shows the results attained when an otherwise identical test is carried out with an air test gas in lieu of the nitrogen test gas. It will be noted from FIG. 5 that the evolution of carbon dioxide begins below about 100° C. Because, as shown by FIG. 4, the propylene is adsorbed and retained on the zeolite at temperatures up to more than 150° C., the evolution of $CO_2$ as shown in FIG. 5 demonstrates that the adsorbed propylene is being oxidized while still adsorbed on the zeolite, thus demonstrating the above-described spillover effect. As the propylene does not desorb from the zeolite at the temperatures at which $CO_2$ evolves as shown in FIG. 5, gas phase oxidation of propylene cannot be the source of the measured $CO_2$.

Comparing FIG. 4 with FIG. 5 shows that, in the presence of air, oxidation of the propylene readily takes place with the combustion beginning at temperatures below about 100° C. and peaking at temperatures below about 200° C. Almost no desorbed propylene was measured at the hydrocarbon analyzer testing the discharged test gases.

EXAMPLE 3

This example compares a test sample in which a platinum oxidation catalyst is intimately interspersed with the adsorbent zeolite with a test sample comprising discrete beds of zeolite adsorbent and a platinum oxidation catalyst.

A. A 1:1 weight ratio mixture of (a) particulate USY zeolite and (b) 2% platinum on alumina particles was prepared by blending a mixture of 4 grams of the USY with 4 grams of activated alumina particles containing 2% by weight platinum, based on the calcined total weight of platinum plus alumina. This mixture of particles (at least 90% of which had a diameter of less than 10 microns) containing an average 1% by weight platinum was blended with a 5:1 weight ratio of the blended particles to bentonite clay. Water was added to the blend to form an extrudable mass. The mass was extruded, chopped and dried to form extrudates about 1/16 inch (1.59 mm) in diameter and 1/4 inch (6.35 mm) in length. The extrudates were calcined at 540° C.

B. Activated alumina particles (at least 90% of the particles being less than 10 microns in diameter) containing 2% by weight platinum, based on the calcined total weight of platinum plus alumina, were blended in a 5:1 weight ratio of platinum/alumina to bentonite clay with sufficient water to form an extrudable mass, which was extruded, chopped and dried to form extrudates measuring about 1/16 inch in diameter (1.59 mm) and 1/4 inch in length (6.35 mm). The extrudates were calcined at 540° C.

C. A quantity of USY extrudates was prepared by blending particulate USY zeolite (at least 90% of the particles being less than 10 microns in diameter) in a 5:1 weight ratio of USY to bentonite clay with sufficient water to form an extrudable mass, which was extruded, chopped and dried to form extrudates measuring about 1/16 inch in diameter (1.59 mm) and 1/4 inch in length (6.35 mm). The extrudates were calcined at 540° C.

D. Two test beds were prepared and identified, respectively, as Case I and Case II. Case I comprised a bed of 8 grams of the intermingled zeolite and platinum/alumina extrudates of Part A of this example. Case II comprised a bed of 4 grams of the zeolite extrudates of Part C of this example, followed by a bed of 4 grams of the platinum/alumina extrudates of Part B, the two beds being separated by a layer of glass wool and arranged so that the test gas flowed first through the bed of uncatalyzed zeolite extrudates of Part C, then through the bed of the platinum/alumina extrudates of Part B. Note that the total amount of platinum is the same for both Case I and Case II.

E. Air containing 10 ppm of toluene measured as $C_1$ and 1.5% by volume water vapor was separately flowed through the test beds of Case I and Case II at a flow rate, measured at 25° C. and one atmosphere pressure, of 10 liters of test gas per minute. For both Case I and Case II, the temperature of the test gas introduced into the beds of test samples during a thermal cycling phase was 80° C. for 17 minutes, after which the temperature was ramped up over a period of 2 minutes to a thermostat setting of 150° C. and maintained for 2 minutes, and then set to a thermostat setting of 80° C. and maintained for 12 minutes. A total of nine thermal cycles was carried out for each of Case I and Case II and then the reactor was slowly heated to 550° C. to burn out, during the "burnout phase", residual hydrocarbons, which were presumably in the form of coke. The results of this test are shown in Table 2.

TABLE 2

| Parameter | Case I - Single Bed of Interspersed Zeolite/Catalyst | Case II - Separate Beds of Zeolite and Catalyst |
| --- | --- | --- |
| Average Toluene (ppmv $C_1$) passing through reactor beds | 5.7 | 5.6 |
| Percentage of total $CO_2$ production produced during the period of toluene flow | 62% | 53% |
| Percentage of total $CO_2$ production produced during the burnout phase | 38% | 47% |
| Temperature for burnout of 50% of hydrocarbons present during the burnout phase | 325° C. | 360° C. |

As shown by the data of Table 2, in Case I (using the interspersed zeolite and platinum oxidation catalyst) more $CO_2$ was produced at the 80 to 150° C. temperature range of the thermal cycling phase than in Case II, which used separate zeolite and platinum oxidation catalysts. The lower temperature required for Case I to attain 50% burnout of residual hydrocarbons as compared to Case II shows that the residual hydrocarbon was less refractory in the interspersed bed of Case I than in the separated beds of Case II. This demonstrates the advantage of intimately intermingling the protective zeolite adsorbent and the first oxidation catalytic composition. Intermingling may be attained by mixing the zeolite and oxidation catalyst in the mass from which the extrudates are made or in a washcoat mixture which is coated onto a suitable carrier, such as on a honeycomb-type carrier. Intermingling may also be attained by using overlying layers of zeolite adsorbent and oxidation catalyst arranged so that the air or other gas to be treated must flow through both or all layers.

EXAMPLE 4

A washcoat of silver-containing ZSM-5 and platinum dispersed on alumina particles was coated onto a cordierite carrier having 400 cells per square inch, equivalent to about 62 cells per square centimeter. The loading of the washcoat was 4.35 grams per cubic inch including 2.2 grams per cubic inch of platinum on alumina, the latter including 76 grams per cubic foot of platinum. The amount of silver was 4% by weight based on the dry calcined weight of silver plus ZSM-5 zeolite. The sample was prepared generally according to the procedures used in Example 1 and a cylindrical section of the cordierite carrier measuring ¾ inch in diameter (equivalent to 1.9 centimeters) and ¾ inch in length (1.9 centimeters) was tested by flowing 20 liters per minute, measured at 25° C. and one atmosphere pressure, of air containing 4 ppm by volume, measured as $C_1$, of propylene. The test air was humidified to contain 1.5% by volume water. The corresponding space velocity was 300,000/hr. During the test the temperature was cycled between about 75 and 130 ° C. during a run which continued for 24 hours with over 90 temperature cycles. The average concentration of propylene passing through the test sample decreased by about 25% compared to the starting concentration.

Oxidation of some of the propylene occurred during the elevated temperature ranges as indicated by increases in $CO_2$ evolution. The propylene flow was stopped and thereafter two additional temperature cycles were conducted. Continued evolution of $CO_2$ after stopping the propylene flow shows that oxidation by the above-described spillover phenomenon of previously adsorbed propylene was continuing despite the lack of fresh propylene feed to the test gas. The average generation of $CO_2$ per temperature cycle during the first 8-hour period of the 24-hour test period was within 1% of the average of $CO_2$ generated during the third 8-hour period. These results demonstrated that the washcoat was effective to adsorb and, by the spillover mechanism, oxidize, propylene over 90 temperature cycles carried out during a 24-hour period.

EXAMPLE 5

The experiment of Example 4 was repeated utilizing ortho-xylene, except that in this case the tested material was one gram of extrudates measuring about ¹⁄₁₆ inch (equivalent to about 1.59 mm) in diameter and about ¼ inch (6.35 mm) in length, and comprised of a 1:1 by weight mixture of HY zeolite and 2% platinum on alumina. The extrudates were prepared by combining 5 parts per weight of the HY and platinum/alumina mixture with 1 part per weight of bentonite clay as an inert binder with sufficient water to make an extrudable mass. The extrudate was dried and calcined at 540° C.

Four liters per minute of air, measured at 25° C. and one atmosphere pressure, containing 1.5 volume percent water and 4 ppm by volume of ortho-xylene, measured as $C_1$, was flowed through the bed of extrudate. This corresponded to a space velocity of 240,000/hr based on the volume of the compacted bed of extrudates. Ortho-xylene was introduced into the test air stream by bubbling nitrogen through liquid ortho-xylene chilled to −15° C. The test reactor was cycled between 80 and 150° C. and evolution of $CO_2$ was noted with increasing temperature. The average hydrocarbon concentration flowed through the sample was reduced by 60% as compared to the starting concentration. During the heating periods, approximately 80% of the adsorbed hydrocarbon was oxidized and 20% was desorbed. The $CO_2$ evolution was substantially uniform over the 24-hour duration of the experiment, with less than a 5% difference between the average $CO_2$ evolution in the first 8-hour period of the testing, as compared to the third 8-hour period of the testing.

EXAMPLE 6

A series of experiments was performed to demonstrate the advantages of protecting the second adsorbent with a protective adsorbent by placing a bed of protective adsorbent upstream of a bed of second adsorbent. Several test cases were carried out as follows.

Case I. A base experiment was performed, where 10 parts per million by volume ("ppmv") of propylene (measured as $C_1$) in an air stream was passed through a test sample comprising a cordierite carrier as described in Example 2 on which was coated Ag/ZSM-5 and Pt/alumina.

Case II. The sample of Case I was regenerated at elevated temperature (550° C.) and the Ag/ZSM-5/Pt/alumina sample was exposed to a mixture of 10 ppmv of propylene ($C_1$) and 25 ppmv of toluene ($C_1$) in a zero air test stream.

Case III. The monolith Case I was regenerated at 550° C. Then, 4 grams of HY zeolite extrudate was placed on top of the Ag/ZSM-5 monolith and the Case II experiment with the toluene/propylene mixture was run again.

Case IV. After the beds of Case III were regenerated at 550° C., the position of the beds was reversed, with Ag/ZSM-5monolith on top and HY extrudates on the bottom so that the test gas flowed first through the Ag/ZSM-5 and then through the HY zeolite. Then the propylene/toluene mixture was passed through the apparatus.

All adsorption phase experiments were carried out at 50° C. to eliminate the possibility of oxidation of propylene, and a water content of 1.5% by volume was maintained in the flow of 10 liters per minute of air, measured at 25° C. and one atmosphere. The amount of HY added (4 grams) represent a 6.8:1 weight ratio of HY to the Ag/ZSM-5 coated onto the carrier, based on the volume and zeolite of the carrier. The hydrocarbon ratio selected reflected a roughly equal mole concentration of propylene and toluene.

The hydrocarbon flow was monitored using a FID-based hydrocarbon analyzer downstream of the samples. The amount of propylene passing through the apparatus was determined by using a mass spectrometric method. The accuracy of the method was checked by comparison with hydrocarbon analyzer measurements for for propylene-only experiments and an average correspondence of 99.5% was obtained. Table 3 below shows the results of the percentage of propylene adsorption measured for the four test cases.

TABLE 3

| Run #(10 minute interval) | Case I | Case II | Case III | Case IV |
| --- | --- | --- | --- | --- |
| 1 | 77.5 | 71.9 | 77.2 | 60.3 |
| 2 | 71.1 | 64.1 | 70.0 | 48.4 |
| 3 | 64.8 | 54.4 | 67.2 | 40.3 |
| 4 | 57.7 | 46.7 | 62.0 | 32.9 |
| 5 | 51.7 | 34.0 | 56.9 | 50.3 |
| 6 | 44.3 | 28.3 | 51.2 | 42.3 |
| 7 | 39.0 | 19.6 | 44.7 | 32.1 |
| 8 | 30.6 | 17.1 | 39.0 | 26.1 |
| 9 | 31.9 | 8.3 | 33.2 | 21.4 |
| Average propylene adsorption | 52.1 | 38.3 | 55.7 | 39.1 |

A comparison of the results of Case I and Case II shows that in the presence of toluene, propylene adsorption on Ag/ZSM-5 is reduced. Case III shows that the addition of a protective adsorbent of HY, a large-pore zeolite upstream of the second adsorbent, returns the adsorption of propylene to the level observed in Case I, i.e., in the absence of toluene. Comparative Case IV, in which the bed of protective adsorbent is located downstream of the bed of the second adsorbent, the reverse of Case III, shows that the level of adsorption of propylene has reverted to Case II. These data show that locating a bed of a large-pored protective adsorbent zeolite such as HY upstream of a bed of a second adsorbent such as Ag/ZSM-5, retains the ability of the latter to adsorb a small olefinic compound, such as propylene, in the presence of a strongly-retained, medium-sized aromatic molecule such as toluene.

Additional tests were carried out at 70° C. In Case V, only propylene was passed through the Ag/ZSM-5/Pt/alumina sample. In Case VI, the propylene/toluene mixture of Case II was used. In Case VII, the sample was first essentially saturated with toluene, then a stream containing only 10 ppm propylene in air was passed through the monolith. The percent of propylene adsorption attained in Cases V, VI and VII is shown in FIG. 6 as a function of the cumulative total elapsed time for a number of test runs for the samples. It is seen that after a number of runs, propylene adsorption for Case V is better than that for Case VI, which is better than that for Case VII. Case VII shows that in the presence of strongly-retained toluene, propylene adsorption trails off rapidly compared to Case V, where toluene was absent. The data from this experiment confirms the competitive disadvantage of propylene in the presence of toluene for adsorption on a second adsorbent such as Ag/ZSM-5, and the advantage to be gained by removal of toluene using a large-pore protective zeolite upstream of the second adsorbent, in accordance with the practices of the invention.

While the invention has been described in detail with reference to specific embodiments thereof, the scope of the invention is not limited to such embodiments and is defined by the appended claims.

What is claim is:

1. A composition for abatement of gas-borne volatile organic compounds ("VOCs") comprises: (a) a protective adsorbent selected from the group consisting of zeolites having a minimum pore aperture of at least about 6.5 Ångstroms an d which are effective, within an adsorption temperature range, (i) to adsorb first VOCs and (ii) to pass therethrough second VOCs of smaller molecular dimensions than the first VOCs, but excluding from the group zeolites containing one or both of silver and copper cations in amounts effective to enhance adsorption of the second VOCs on the protective adsorbent; (b) a second adsorbent selected from the group consisting of one or more of silver-containing zeolites and copper-containing Y zeolite and effective, within the adsorption temperature range, to adsorb, at least in the absence of moisture, the second VOCs; (c) a catalytically effective amount of a protective oxidation catalyst disposed relative to the protective and second adsorbents so as to contact and, under oxidation conditions defined below, promote the oxidation of first VOCs prior to the first VOCs' contacting the second adsorbent; and (d) a second oxidation catalyst intimately intermingled with the second adsorbent, and present in an amount effective to promote, under the oxidation conditions, oxidation of second VOCs retained on the second adsorbent, the intermingled second oxidation catalyst and second adsorbent being disposed to contact the effluent from the protective adsorbent and protective oxidation catalyst;

the oxidation conditions comprising an oxidation temperature range which is hotter than the adsorption temperature range, and both the adsorption and oxidation temperature ranges lying in an operating temperature range of between about 20 to 500° C.

2. The composition of claim 1 wherein the second adsorbent is selected from the group consisting of one or more of silver-containing ZSM-5, silver-containing Y zeolite, silver-containing Beta and copper-containing Y zeolite and is effective to adsorb the second VOCs in the presence and in the absence of moisture.

3. The composition of claim 1 or claim 2 wherein the protective adsorbent is selected from the group consisting of one or more of Beta, Y zeolite and Mordenite.

4. The composition of claim 1 or claim 2 wherein the protective adsorbent comprises Y zeolite.

5. The composition of claim 4 wherein the second adsorbent comprises silver-containing ZSM-5.

6. The composition of claim 1 or claim 2 wherein the minimum pore aperture of the protective adsorbent is from about 6.5 to 13 Ångstroms.

7. The composition of claim 1 or claim 2 wherein the second adsorbent comprises silver-containing ZSM-5.

8. The composition of claim 1 or claim 2 wherein the operating temperature range is from about 20 to 250° C.

9. The composition of claim 1 or claim 2 wherein the protective oxidation catalyst is intimately intermingled with the protective adsorbent.

10. The composition of claim 1 or claim 2 wherein the protective adsorbent comprises a cation-containing zeolite, the cation being selected from the group consisting of one or more of proton, alkali metal, alkaline earth metal and rare earth metal cations.

11. The composition of claim 1 or claim 2 wherein the silver-containing zeolites contain sufficient silver to occupy from about 10 to about 100 percent of the alumina sites of the silver-containing zeolites and the copper-containing Y zeolite contains sufficient copper to occupy from about 10 to about 100 percent of the alumina sites of the copper-containing Y zeolite.

12. The composition of claim 1 or claim 2 wherein the protective oxidation catalyst is dispersed directly onto one or both of (i) the protective adsorbent, and (ii) a particulate refractory metal oxide support which is intimately intermingled with the protective adsorbent.

13. The composition of claim 1 or claim 2 wherein the second oxidation catalyst is dispersed directly onto one or both of (i) the second adsorbent and (ii) a particulate refractory metal oxide support which is intimately intermingled with the second adsorbent.

14. The composition of claim 1 or claim 2 wherein the protective and second oxidation catalysts are selected from the group consisting of at least one of platinum group metal catalytic components and transition metal catalytic components.

15. The composition of claim 1 or claim 2 wherein the protective and second oxidation catalysts comprise platinum catalytic components.

16. The composition of claim 15 wherein the composition contains from about 0.1 to about 5 percent by weight platinum, measured as Pt, as the platinum group metal catalytic components.

17. The composition of claim 1 or claim 2 wherein the proportion by weight of the protective adsorbent to the second adsorbent is from about 1:9 to about 9:1, based on the weights of the respective protective and second adsorbents, including their cations.

18. The composition of claim 1 or claim 2 wherein the minimum pore aperture of the protective adsorbent is from about 6.5 to 13 Ångstroms, the operating temperature range is from about 20 to 250° C., and the silver-containing zeolites contain sufficient silver to occupy from about 10 to about 100 percent of the alumina sites of the silver-containing zeolites and the copper-containing Y zeolite contains sufficient copper to occupy from about 10 to about 100 percent of the alumina sites of the copper-containing Y zeolite.

19. Apparatus for abatement of volatile organic compound pollution in an air stream defines an air flow path through the apparatus for such air stream and comprises: (a) an abatement composition for abatement of volatile organic compounds ("VOCs") comprising (i) a protective adsorbent selected from the group consisting of zeolites having a minimum pore aperture of at least about 6.5 Ångstroms and which are effective within an adsorption temperature range (A) to adsorb first VOCs and (B) to pass therethrough second VOCs of smaller molecular dimensions than the first VOCs, but excluding from the group zeolites containing one or both of silver and copper cations in a mounts effective to enhance adsorption of the second VOCs on the protective adsorbent; (ii) a second adsorbent selected from the group consisting of one or more of silver-containing zeolites and copper-containing Y zeolite and effective, within the adsorption temperature range, to adsorb, at least in the absence of moisture, the second VOCs; (iii) a catalytically effective amount of a protective oxidation catalyst disposed relative to the protective and second adsorbents so as to contact and, under oxidation conditions as defined below, promote the oxidation of first VOCs prior to the first VOCs' contacting the second adsorbent; and (iv) a second oxidation catalyst intimately intermingled with the second adsorbent, and present in an amount effective to promote, under the oxidation conditions, oxidation of second VOCs retained on the second adsorbent, the intermingled second oxidation catalyst and second adsorbent being disposed to contact the effluent from the protective adsorbent and protective oxidation catalyst;

the oxidation conditions comprising an oxidation temperature range which is hotter than the adsorption temperature range, both the adsorption and oxidation temperature ranges lying in an operating temperature range of between about 20 to 500° C.;

(b) a treatment zone within which the abatement composition is disposed;

(c) a heat exchanger disposed in heat exchange relationship with one or both of (i) such air stream at or upstream of the treatment zone; and (ii) the abatement composition, and (d) a temperature control device operatively associated with the heat exchanger to periodically vary, between the adsorption temperature range and the oxidation temperature range, the temperature of one or both of (i) the air stream in the treatment zone and (ii) the abatement composition.

20. The apparatus of claim 19 wherein the protective adsorbent is selected from the group consisting of one or more of Beta, Y zeolite and Mordenite and the second adsorbent is selected from the group consisting of one or more of silver-containing ZSM-5, silver-containing Y zeolite, silver-containing Beta and copper-containing Y zeolite.

21. The apparatus of claim 19 wherein the protective adsorbent is selected from the group consisting of one or more of Beta, Y zeolite and Mordenite.

22. The apparatus of claim 19 wherein the second adsorbent is selected from the group consisting of one or more of silver-containing ZSM-5, silver-containing Y zeolite, silver-containing Beta and copper-containing Y zeolite and is effective to adsorb the second VOCs in the presence and in the absence of moisture.

23. The apparatus of claim 19 or claim 20 wherein the minimum pore aperture of the protective adsorbent is from about 6.5 to 13 Ångstroms.

24. The apparatus of claim 19 or claim 20 wherein the operating temperature range is from about 20 to 250° C.

25. The apparatus of claim 19 wherein the protective adsorbent comprises Y zeolite.

26. The apparatus of claim 19 or claim 25 wherein the second adsorbent comprises silver-containing ZSM-5.

27. The apparatus of claim 19 or claim 20 wherein the treatment zone comprises (i) an upstream treatment zone defined by the protective adsorbent, and (ii) a downstream treatment zone defined by the second adsorbent, the upstream and downstream treatment zones being positioned relative to each other in the air flow path so that the air stream is flowed first through the upstream treatment zone and then through the downstream treatment zone.

28. The apparatus of claim 19 or claim 20 wherein the protective adsorbent comprises a cation-containing zeolite, the cation being selected from the group consisting of one or more of proton, alkali metal, alkaline earth metal and rare earth metal cations.

29. The apparatus of claim 19 or claim 20 wherein the silver-containing zeolites contain sufficient silver to occupy from about 10 to 100 percent of the alumina sites of the silver-containing zeolites and the copper-containing Y zeolite contains sufficient copper to occupy from about 10 to about 100 percent of the alumina sites of the copper-containing Y zeolite.

30. The apparatus of claim 19 or claim 20 wherein the protective oxidation catalyst is dispersed directly onto one or both of (i) the protective adsorbent and (ii) a particulate refractory metal oxide support.

31. The apparatus of claim 19 or claim 20 wherein the second oxidation catalyst is dispersed directly onto one or both of (i) the second adsorbent and (ii) a particulate refractory metal oxide support which is intimately intermingled with the second adsorbent.

32. The apparatus of claim 19 or claim 20 wherein the first and second oxidation catalysts are selected from the group consisting of one or more of platinum group metal catalytic components and transition metal catalytic components.

33. The apparatus of claim 19 or claim 20 wherein at least one of the first and second oxidation catalysts comprises a platinum catalytic component.

34. The apparatus of claim 31 wherein the composition contains from about 0.1 to 5 percent by weight platinum, as Pt.

35. The apparatus of claim 19 or claim 20 wherein the proportion by weight of the protective adsorbent to the second adsorbent is from about 1:9 to about 9:1, based on the weight of the zeolites including their cations.

36. A method for abatement of volatile organic compound pollution comprises treating an air stream containing volatile organic compounds ("VOCs") by contacting the air stream with an abatement composition comprising (i) a protective adsorbent selected from the group consisting of zeolites having a minimum pore aperture of at least about 6.5 Ångstroms and which are effective, within an adsorption temperature range, (A) to adsorb first VOCs and (B) to pass therethrough second VOCs of smaller molecular dimensions than the first VOCs, but excluding from the group zeolites containing one or both of silver and copper cations in amounts effective to enhance adsorption of the second VOCs on the protective adsorbent; (ii) a second adsorbent selected from the group consisting of one or more of silver-containing zeolites and copper-containing Y zeolite and effective, within the adsorption temperature range, to adsorb, at least in the absence of moisture, the second VOCs; (iii) a catalytically effective amount of a protective oxidation catalyst disposed relative to the protective and second adsorbents so as to contact and, under oxidation conditions defined below, promote the oxidation of first VOCs prior to the first VOCs' contacting the second adsorbent; and (iv) a second oxidation catalyst intimately intermingled with the second adsorbent, and present in an amount effective to promote, under the oxidation conditions, containing oxidation of second VOCs retained on the second adsorbent, the intermingled second oxidation catalyst and second adsorbent being disposed to contact the effluent from the protective adsorbent and protective oxidation catalyst;

the oxidation conditions comprising an oxidation temperature range which is hotter than the adsorption temperature range, both the adsorption and oxidation temperature ranges lying in an operating temperature range of between about 20 to 500° C., and the method comprising the steps of:
   (a) flowing the air stream in series to first contact it with the protective adsorbent and then to contact it with the second adsorbent; and
   (b) periodically varying between the adsorption temperature range and the oxidation temperature range the temperature at which the air stream contacts the protective and second adsorbents;

whereby, during the oxidation conditions, oxidation of desorbed first VOCs is promoted by the first catalytic composition and second VOCs migrate from adsorption sites on the second adsorbent to catalytic sites on the second adsorbent, at which catalytic sites oxidation of the second VOCs is promoted.

37. The method of claim 36 wherein the protective adsorbent is selected from the group consisting of one or more of Beta, Y zeolite and Mordenite and the second adsorbent is selected from the group consisting of one or more of silver-containing ZSM-5, silver-containing Y zeolite, silver-containing Beta and copper-containing Y zeolite.

38. The method of claim 36 wherein the protective adsorbent is selected from the group consisting of one or more of Beta, Y zeolite and Mordenite.

39. The method of claim 36 wherein the second adsorbent is selected from the group consisting of one or more of silver-containing ZSM-5, silver-containing Y zeolite, silver-containing Beta and copper-containing Y zeolite and is effective to adsorb the second VOCs in the presence and in the absence of moisture.

40. The method of claim 36 or claim 37 wherein the minimum pore aperture of the protective adsorbent is from about 6.5 to 13 Ångstroms.

41. The method of claim 36 or claim 37 wherein the operating temperature range is from about 20 to 250° C.

42. The method of claim 41 wherein the adsorption temperature range is from about 20 to 100° C. and the oxidation temperature range is from about 100 to 250° C.

43. The method of claim 36 or claim 37 wherein the protective adsorbent comprises a cation-containing zeolite, the cation being selected from the group consisting of one or more of proton, alkali metal, alkaline earth metal and rare earth metal cations.

44. The method of claim 36 or claim 37 wherein the silver-containing zeolites contain sufficient silver to occupy from about 10 to about 100 percent of the alumina sites of the silver-containing zeolites and the copper-containing Y zeolite contains sufficient copper to occupy from about 10 to about 100 percent of the alumina sites of the copper-containing Y zeolite.

45. The method of claim 36 wherein the protective adsorbent comprises Y zeolite.

46. The method of claim 36 or claim 45 wherein the second adsorbent comprises silver-containing ZSM-5.

47. The method of claim 36 or claim 37 wherein the first oxidation catalyst is intimately intermingled with the protective adsorbent.

48. The method of claim 36 or claim 37 wherein the first oxidation catalyst is interposed between the protective adsorbent and the second adsorbent and the air stream is contacted with the first oxidation catalyst after contacting the protective adsorbent and before contacting the second adsorbent.

49. The method of claim 36 or claim 37 wherein the protective oxidation catalyst is dispersed directly onto one or both of (i) the protective adsorbent itself, and (ii) a particulate refractory metal oxide support which is intimately intermingled with the protective adsorbent.

50. The method of claim 36 or claim 37 wherein the second oxidation catalyst is dispersed directly onto one or both of (i) the second adsorbent and (ii) a particulate refractory metal oxide support which is intimately intermingled with the second adsorbent.

51. The method of claim 36 or claim 37 wherein the first and second oxidation catalysts are selected from the group consisting of one or more of platinum group metal catalytic components and transition metal catalytic components.

52. The method of claim 51 wherein the first and second oxidation catalysts comprise platinum catalytic components.

* * * * *